INVENTOR~
DONAVEN E. GOLAY
BY Herbert A. Weinturn
ATTORNEY

United States Patent Office 2,809,607
Patented Oct. 15, 1957

2,809,607
PULSATED MILK LINE MILKING ADAPTER

Donovan E. Golay, Cambridge City, Ind., assignor to Farmer Feeder Company, Inc., Cambridge City, Ind.

Application January 24, 1956, Serial No. 560,988

1 Claim. (Cl. 119—14.41)

This invention relates to a system for milking cows and particularly to a low vacuum system wherein a vacuum line is pulsated and there is no pulsator at the milking machine. A primary object of the pulsated vacuum line is to provide milking of cows day after day, and milking after milking, at the same constant speed in the absence of speed variations as might be occasioned in using pulsators at the machine wherein a number of machines are employed, each carrying a pulsator possibly operating at a speed different from the speed of a pulsator on another machine. It is not practical to use the same machine on the same cow at each milking.

A primary object of the present invention is to provide adapter means for pails in order to accommodate the pails and even weighing cans or jars or in the absence of having to employ a pulsator at the machine, and furthermore to provide the utmost possible sanitation by the elimination of moving parts.

The pail covers are changed slightly to receive and hold the adapters but otherwise the pails remain the same as when provided for individual pulsators.

Many other objects and advantages of the invention will be better understood by those versed in the art from the following description of the invention as illustrated in the accompanying drawings, in which Fig. 1 is a view in side elevation of a structure as applied to both short tube and long tube milkers;

Figure 1:
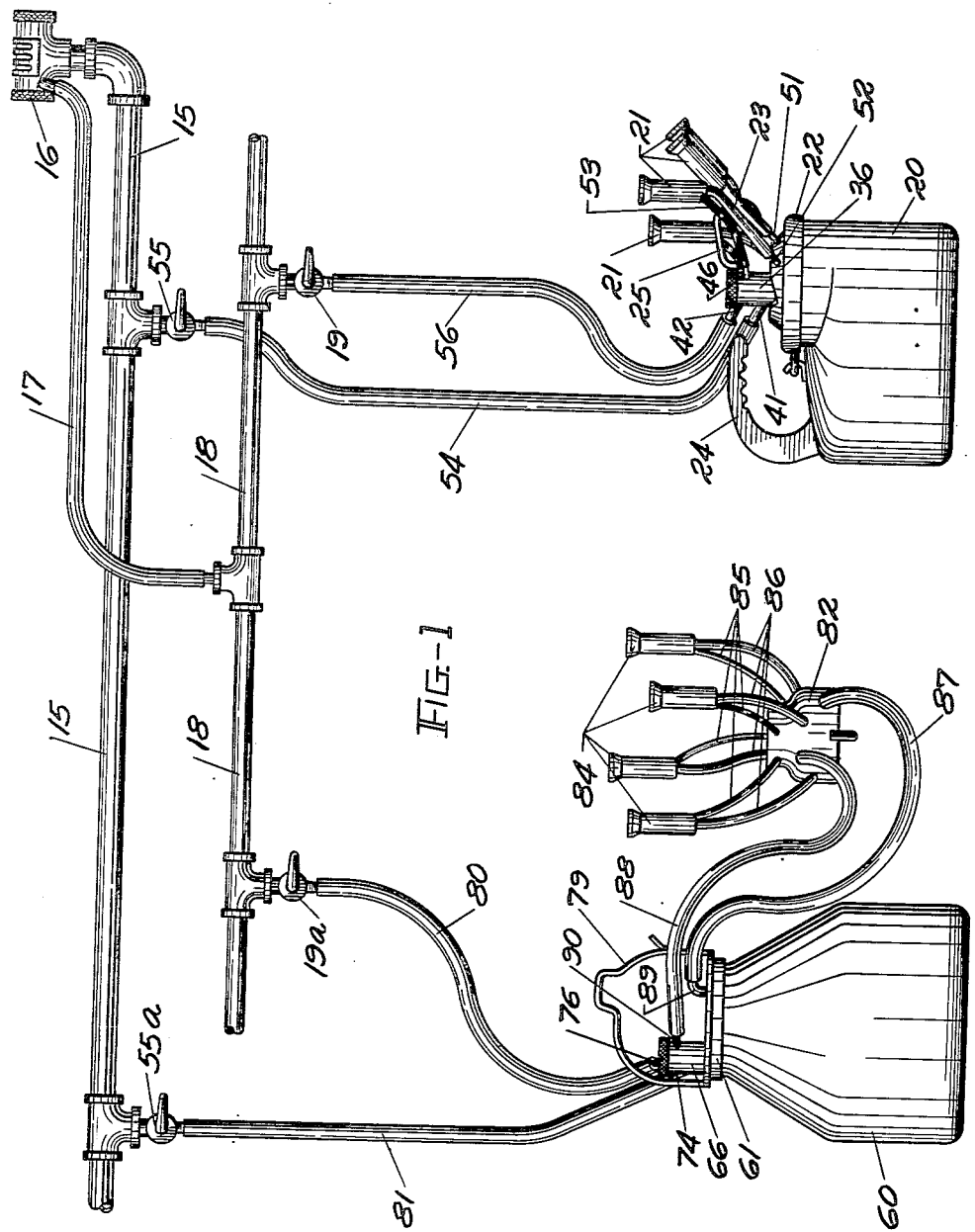

Referring to Fig. 1, there is supplied a constant vacuum pressure line 15, to which is connected a pulsator 16 of that type well known to those versed in the art which will automatically operate under the constant vacuum pressure set up in the line 15 to deliver a pulsating vacuum pressure in a line 17. This line 17 connects with an operating line 18 which extends normally along the various stalls in which the cows are held during the milking period. At each stall or between adjacent stalls there is provided a stall cock 19, all in the usual manner.

The invention will be described first in relation to its use with a short tube milker. By this term "short tube" it is to be understood in the usual language of the art, that the milker is of that type which may be suspended under the cow by means of a surcingle from a strap over the cow's back so that the pail 20 will be immediately forward of the cow's udder and the tea cups 21 may be applied to the cow's teats, the cups 21 being interconnected with the pail cover 22 by means of quite short tubes 23. The pail 20 is provided with a handle 25 to receive thereunder the surcingle (not shown) as has just been mentioned. That structure is well known and is commonly employed. However there is a slight difference over the standard structure in the pail cover 22.

Figure 4:
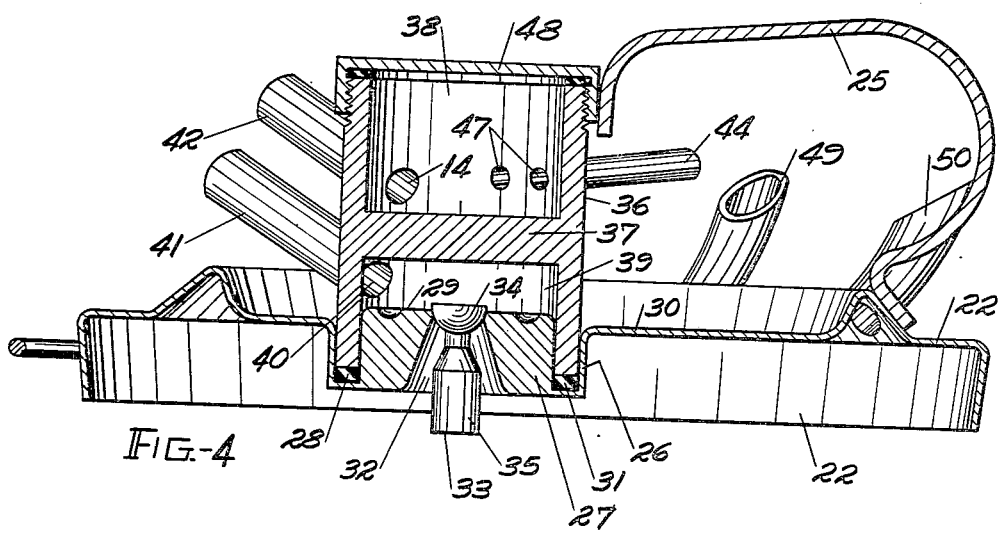
Fig. 4 is a view in vertical, central section on the line 4—4 in Fig. 2.
Figures 5, 6:
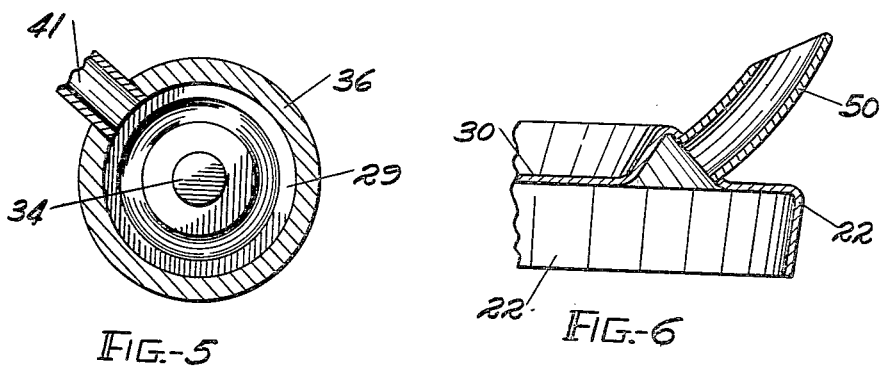
Fig. 5 is a view in transverse section on the line 5—5 in Fig. 3.
Fig. 6 is a view in vertical section on the line 6—6 in Fig. 2.

For convenience, in carrying the pail with the cover, the cover 22 is supplied with a handle 24. A well 26 is formed in the top of the cover 22 in a cylindrical form, and is eccentric of the cover 22. That is, the well 26 is located to one side of the center of the cover 22 as is indicated in Fig. 4 particularly.

A boss 27 extends concentrically of the well 26 and upwardly from the floor 28, terminating by a top face 29 slightly above the top portion 30 of the cover 22. The external diameter of this boss 27 is made to be such that there is an annular groove between its outer surface and the inner surface of the well 26, sufficient to receive a flexible gasket 31 therein.

The boss 27 is provided with a frusto-conical bore 32 therethrough.

A check valve is provided to seat around the margin of the upper end of this bore 32 at the floor 29. As indicated in Fig. 4, a satisfactory form of this check valve generally designated by the numeral 33, embodies a substantially semi-spherical valve head 34 which will seat around the margin of the bore 32 as indicated, and from the valve head 34 there is a body 35 suspended in the nature of a weight normally tending to seat the head 34, even though the cover 22 may be tilted somewhat from the horizontal.

The adapter proper, generally designated by the numeral 36, has a main body cylindrical in shape, and divided by a transverse partition 37 into an upper chamber 38 and a lower chamber 39. The axial length of the chamber 39 and its diameter are such that the adapter 36 may be dropped freely downwardly over the boss 27 to have the lower end of the adapter 36 rest on the gasket 31 as sealing medium. When the adapter 36 is thus rested on the gasket 31, there is remaining in the chamber 39 an axial length thereof whereby there is room for a port 40 opening into the chamber 39, this port being at the inner end of a short length of rigid tube 41 preferably extending angularly upwardly and away from the outside of the adapter 36.

Figure 2:
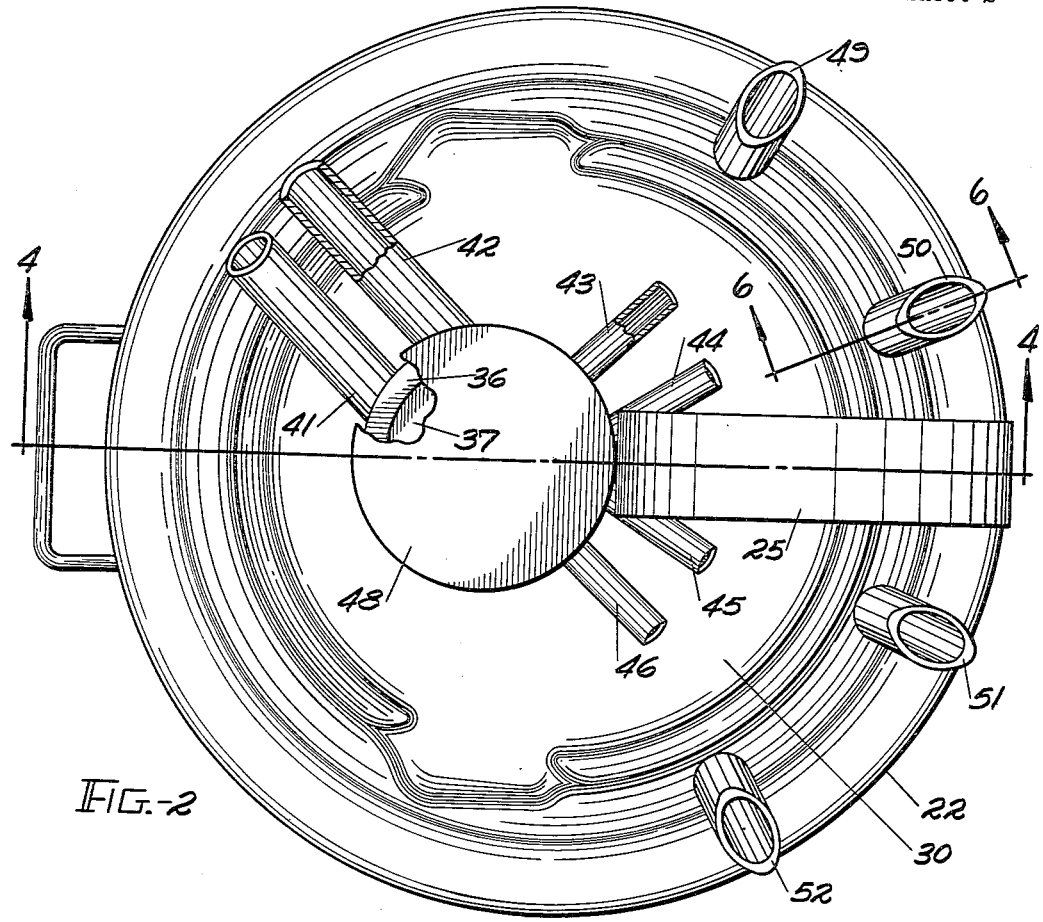
Fig. 2 is a view in top plan and partial section of the short tube milker pail cover.

A second tube 42 is fixed to the side of the adapter 36, and opens through a port 14 into the chamber 38. These two tubes 41 and 42 may be of the same diameter, one internal diameter being currently used is in the neighborhood of three-eighths of an inch. Four smaller tubes, that is, tubes of less diameter, designated by the numerals 43, 44, 45, and 46, Fig. 2, are fixed to the adapter 36 to extend outwardly therefrom in circumferentially spaced apart relation, to open into the chamber 38 by means of the inner ports 47.

Figure 3:
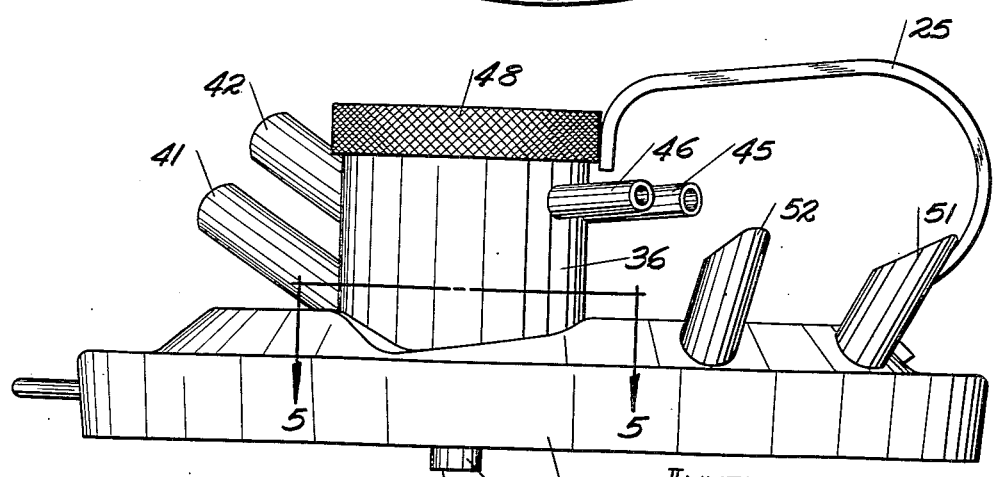
Fig. 3 is a view of the pail cover in side elevation.

The chamber 38 of the adapter 36 is provided with a removable cap 48, herein shown as screw-threadedly engaging the adapter 36, in a sealing manner. For stability, the external wall of the cap 48 may be in contact with the end of the handle 25 as indicated in Figs. 2–4 inclusive.

The cover 22 is provided with four milk inlet tubes 49, 50, 51, and 52. The internal diameters of these tubes 49—52 are as great or even slightly larger than is the diameter of each of the tubes 41 and 42.

The structure thus far described relates to the cover 22 to be used in conjunction with the pail 20, being the right hand pail shown in Fig. 1. When the structure is assembled for milking, the tubes 23, short in nature, are slipped over the respective metal tubes 49—52, with the other ends of those tubes 23 being applied to the ends of the teat cups 21 in the usual manner. Flexible vacuum tubes 53, Fig. 1, are interconnected with the vacuum connections of the teat cups 21 by similar ends, and by their other ends are fitted over the rigid metal tubes 43—46 carried by the adapter 36. A flexible tube 54 is engaged by one end over the end of the stall cock 55 connected to the constant vacuum line 15, and by its other end to the rigid metal tube 41 extending from the adapter 36. A second flexible tube 56 connects by one end with the pulsated vacuum line stall cock 19, and by its other end over the rigid metal tube 42 carried by the adapter 36.

With the milking machine thus set up, the two cocks 19 and 55 are opened, and the teat cups 21 applied to the cow's teats in the usual manner. The teat cups 21 are of the usual type carrying flexible inflations within a rigid metal shell (not illustrated in detail because of these elements being standard construction and well known in the art) so that the pulsating pressure from the line 18 is transmitted through the tube 56 to the upper chamber 38 of the adapter 36, and in turn this pulsating vacuum pressure is applied to the teat cups 21 through the smaller tubes 53. The tube 54 being connected to the non-pulsating line 15 which is maintained at a constant vacuum pressure communicates that vacuum pressure to the lower chamber 39 of the adapter 36, lifting the check valve 33 and thereby vacuumizing the pail 20. The cover 22 is maintained on the pail 20 in the usual manner by a gasket, not shown. Thus, milk drawn from the cow drains through the tubes 23 and through the cover rigid tubes 49—52 to flow into the pail 20. The only shiftable part in the adapter is the check valve 33.

When the milking operation is completed, the stall cocks 19 and 55 are shut off, and the tubes 54 and 56 may be disconnected or left in position for attachment to the next milking unit to be used on the next cow brought into the stall. The pail 20 with its cover 22 may be taken to the milk room for unloading and then be brought back for a subsequent cow to be milked.

Therefore, it is to be seen that I have produced an exceedingly simple structure for the purposes intended, and since structural changes may conceivably be made in the structure as described, all without departing from the spirit of the invention, I do not desire to be limited to the precise forms shown and described beyond the limitations which may be imposed by the following claim.

I claim:

In a milking system employing a milk receiving vessel normally supported from a cow during milking, fixed-wall teat cups with internal inflations, a constant pressure vacuum line, a pulsated vacuum line, and a pulsator located remotely from said vessel; the combination of a milk vessel cover; a milk receiving nipple fixed to said cover for each of said cups; a cylindrical boss fixed to and extending from said cover and having a frusto-conical bore entering from the underside and opening through the boss top side; a valve seat defined at said bore opening; a valve having a spherical underside resting on and sealing off said valve seat; and integral weight of less diameter than that of said bore hanging from the weight rocking the valve and maintaining it on its seat under tilting of the cover from the horizontal; an adapter cylindrical in shape open from both ends, one end telescoping with said boss; an internal transverse partition across said adapter dividing the adapter into lower and upper chambers; a constant vacuum line connector nipple carried by said adapter and opening into said lower chamber; a pulsated vacuum line connector nipple carried by said adapter and opening into said upper chamber; a nipple opening into said upper chamber for each of said teat cups to apply said pulsating pressure thereto through the upper chamber; a quick detachable cap sealably engaging said adapter across its upper end; and a cover carrying member carried by and spaced above the cover and extending toward said adapter; said cover carrying member bearing against said adapter cap; and said adapter teat cup connector nipples being normally directed generally toward said cover carrying member.

References Cited in the file of this patent

UNITED STATES PATENTS

| | | |
|---|---|---|
| 1,854,305 | Hapgood | Apr. 19, 1932 |
| 2,122,471 | Hulbert | July 5, 1938 |
| 2,237,444 | McCornack | Apr. 8, 1941 |
| 2,460,049 | Weiby | Jan. 25, 1949 |